United States Patent [19]

Murakami et al.

[11] Patent Number: 4,621,223

[45] Date of Patent: Nov. 4, 1986

[54] LOAD DRIVE CONTROL SYSTEM FOR A MOTOR VEHICLE WINDOW

[75] Inventors: Yuichi Murakami, Tokyo; Kenichi Komuro, Toyota; Taneichi Kawai, Anjyo; Gosaku Terabayashi, Okazaki; Hisatoshi Ohta, Kariya, all of Japan

[73] Assignees: Aisin Seiki Kabushikikaisha; Toyota Jidosha Kabushikikaisha, both of Japan

[21] Appl. No.: 751,920

[22] Filed: Jul. 5, 1985

[30] Foreign Application Priority Data

Jul. 5, 1984 [JP] Japan .................. 59-139349
Jul. 26, 1984 [JP] Japan .................. 59-155932
Aug. 2, 1984 [JP] Japan .................. 59-159745

[51] Int. Cl.$^4$ ............................................. H02P 1/22
[52] U.S. Cl. ................................. 318/282; 318/256; 318/286; 49/28
[58] Field of Search ............... 318/256, 264, 265, 266, 318/267, 280, 282, 283, 285, 286; 49/26, 28

[56] References Cited

U.S. PATENT DOCUMENTS

| | | | |
|---|---|---|---|
| 3,252,503 | 5/1966 | Jackson | 49/28 X |
| 3,319,696 | 5/1967 | Wiegand | 49/28 X |
| 3,465,476 | 9/1969 | Rayner et al. | 49/28 |
| 3,651,389 | 3/1972 | Ito et al. | 318/286 X |
| 3,689,814 | 9/1972 | Holt | 318/286 X |
| 3,727,348 | 4/1973 | Steinmann et al. | 49/28 |
| 3,733,532 | 5/1973 | Hill | 318/286 X |
| 3,815,005 | 6/1974 | Berger | 318/286 X |
| 4,001,661 | 1/1977 | Terabayashi | 318/264 |
| 4,272,708 | 6/1981 | Carle et al. | 318/286 X |
| 4,351,016 | 9/1982 | Felbinger | 318/286 X |
| 4,373,149 | 2/1983 | Coste | 318/256 X |
| 4,394,605 | 7/1983 | Terazawa | 318/469 X |
| 4,459,521 | 7/1984 | Barge | 318/267 |
| 4,476,416 | 10/1984 | Licata et al. | 318/283 |

FOREIGN PATENT DOCUMENTS

| | | | |
|---|---|---|---|
| 0998092 | 1/1976 | Canada | 318/265 |
| 48-44445 | 12/1973 | Japan | 318/265 |
| 2013428 | 8/1979 | United Kingdom | 318/265 |

Primary Examiner—William M. Shoop, Jr.
Assistant Examiner—Bentsu Ro
Attorney, Agent, or Firm—Sughrue, Mion, Zinn, Macpeak, and Seas

[57] ABSTRACT

A system is disclosed for energizing an electric motor for forward or reverse rotation, which motor operative to open or close a side window pane of a door or a sun roof panel of an automobile. The motor is energized for forward or reverse rotation in accordance with the status of a pressure sensitive switch which is mounted on a window frame to detect the presence of an object or hand and an operation of up/down command changeover switches. If the presence of an object is detected by the sensor during the forward rotation of the motor which is effective to close the window pane, a self-hold circuit is triggered or set, and the motor is energized for reverse rotation. The motor is deenergized at a given time interval after the sensor has ceased to detect the object. The motor remains at rest as long as the self-hold circuit is set. In certain embodiments, the self-hold circuit is reset when up command changeover switch is moved from its up position to its nonoperative position. In other embodiments, the self-hold circuit is reset when down command changeover switch is transferred to its down command position.

16 Claims, 13 Drawing Figures

LOAD DRIVE CONTROL SYSTEM FOR A MOTOR VEHICLE WINDOW

BACKGROUND OF THE INVENTION

The invention relates to a load drive system which drives a load in a forward or reverse direction in response to a command issued in the form of a switch operation by an operator, and in partiuclar, to a control system for a safety load drive including an object sensor which detects the presence of an object standing in the way to the movement of a load and wherein a drive mechanism is deenergized whenever the sensor detects the presence of such object while the load is being driven in a given direction and then is energized to drive the load in the opposite direction.

A typical example of such system is found in drive systems which are used in driving side window pane and roof panel of an automobile. An exemplary side window pane drive system is disclosed in U.S. Pat. No. 4,394,605 issued to Terazawa. This patent discloses an embodiment in FIG. 2 thereof comprising an up/down momentary command switch which provides a command by a one-touch action, a combination of up and down self-hold circuits which maintan the energization of an electric motor as indicated by the command from the switch, a resistor which detects a load current through the electric motor which is used to drive a side window pane of an automobile up and down, a pair of comparators for comparing the current flow through the resistor against a reference value, a pressure sensitive switch for detecting the presence of any object which may be interposed between an edge of the pane and an associated window frame during the upward movement of the side window pane, a reset circuit for resetting the both self-hold circuits to deenergize the motor whenever the load current goes outside a given range, and a circuit for activating the down self-hold circuit in response to the detection of an object by the pressure sensitive switch. In that patent, in particular, in an embodiment shown in FIG. 2 thereof, the temporary closure of the up command switch with an up contact allows the up self-hold circuit to be activated to energize the motor for forward rotation, thereby causing the side window pane to move upward vertically. If an object exists between a window frame and the window pane, and the pane moves into abutment against the object, the pressure sensitive switch is closed to activate the down self-hold circuit. Thereupon, an equal voltage is applied to the opposite terminals of the motor, which therefore comes to a stop. Thereupon, the load current reduces below the lower limit of the given range, whereby one of the comparators is reset, thus resetting both the up and the down self-hold circuit. Accordingly, it will be seen that whenever the pressure sensitive switch has detected an object, the motor comes to a stop and the system returns to its standby condition where it waits for another operation of the up/down momentary switch. However, it is desirable in such system that the side window pane be automatically driven downward, rather than stopping its movement whenever the pressure sensitive switch has detected an object.

Japanese Patent Publication No. 44,445/1973 discloses another side window drive system in which if a pressure sensitive switch becomes closed during the time an electric motor is energized for forward rotation to move a side window pane upward, the motor is energized for reverse rotation to move the window pane downward. However, in this system, the motor is energized for reverse rotation only during the time the pressure sensitive switch remains closed. Hence, as soon as the window pane is lowered slightly in response to the energization of the motor for reverse rotation, the pressure sensitive switch becomes open to interrupt such energization. The motor is then energized for forward rotation which is previously established, again causing the pane to press against the object. It will therefore be seen that the pane repeats its movement up and down as long as the object exists, presenting a difficulty in removing the object which is located between a window frame and the pane. In such system, it is desirable that the pane be automatically driven for downward movement, rather than repeating its upward and downward movement, whenever the presence of the object is detected.

SUMMARY OF THE INVENTION

It is a first object of the invention to provide a load drive control system in which whenever the movement of a load being driven, for example, a side window pane, is impeded, the drive applied to the load is interrupted, followed by driving it in the reverse direction until it is brought to a stop. It is a second object of the invention to provide a load drive control system which inhibits the interruption of a drive applied to a load, which would normally occur in response to the detection of an object by an object sensor, if the load is moving in a direction away from the object. It is a third object of the invention to provide a load drive control system in which if a drive to a load is interrupted in response to the detection of an object which stands in the way to the movement of the load, and in which the inhibition of the interruption of the drive is terminated in response to a switch operation which commands a drive to be applied to the load which causes the latter to move away from the object.

The above objects are achieved in accordance with the invention by providing a load drive control system comprising a d.c. motor for driving a load, the motor having a first and a second terminal which feed the motor; a plurality of supply lines; first switching means for selectively applying a first or a second potential on the supply lines to the first terminal of the motor; second switching means for selectively applying the second or the first potential on the supply lines to the second terminal of the motor; self-hold means for rendering and maintaining the first switching means in a condition to apply the second potential to the first terminal in response to the detection of the presence of an object by an object sensor; automatic return control means for rendering the second switching means in a condition in which it applies the first potential to the second terminal in response to the detection of the presence of an object by an object sensor and for rendering the second switching means in a condition to apply the second potential to the second terminal after a given time interval during which a load is driven and which occurs when the object sensor has changed from its detecting the presence of an object to its not detecting the presence of such object; and reset switch means for resetting the self-hold means.

Under normal or standby condition, the first switching means connects a first one of the supply lines to the first terminal, and the second switching means connects a second one of the supply lines to the second terminal. Under this condition, when a positive potential is applied to the first line and the ground potential is applied to the second line, the d.c. motor is energized for forward rotation, thus driving a load such as a side window pane in a given direction, for example, in an upward direction. When the object sensor detects the presence of an object, the self-hold means changes the first switching means to its condition in which it applies the second potential to the first terminal, and the self-hold means is latched in this condition. The automatic return control means changes the second switching means to its condition in which it applies the first potential to the second terminal. This reverses the rotation of the motor, thus driving the side window pane in a downward direction. Subsequently, after a given drive in the reverse direction, for example, after a given time interval in which the drive in the reverse direction is applied or after the side window pane is driven to its fully open position or its lower limit position, the automatic return control means allows the second switching means to be returned to its condition in which it applies the second potential to the second terminal. As a consequence, the second potential is applied to both the first and the second terminal, whereby the motor comes to a stop.

When the reset switch means is operated, the self-hold means is reset, returning the first switching means to its normal condition in which it connects the first line to the first terminal. The application of the first or the second potential to the first line or the application of the first or the second potential to the second line depends on an operation of a load drive command switch. If the command switch is operated to command a movement of the side window pane in a given direction, for example, in an upward direction, the positive potential is applied to the first line while the ground potential is applied to the second line. Conversely, if the switch is operated to command a movement of the side window pane in the opposite direction, the ground potential is applied to the first line while the positive potential is applied to the second line.

In a preferred embodiment of the invention, the load drive command switch comprises an up command switch which normally connects the first line to the ground potential of a power source and which connects the first line to the positive potential of the source when operated, and a down command switch which normally connects the second line to the ground potential of the source and which connects the second line to the positive potential of the source when operated. The object sensor is connected between the first line on one hand and the self-hold means and the automatic return control means on the other hand in order to allow the load drive to be interrupted in response to the detection of the presence of an object when the up command switch is operated and to inhibit the interruption of the load drive in response to the detection of the presence of an object when the down command switch is operated. When the up command switch is operated, the positive potential is applied to the first line and hence to the object sensor, which is therefore capable of developing a detection signal. When neither up nor down command switch is operated and when the down command switch is operated, the first line assumes the ground potential and hence the object sensor cannot develop an object detection signal. Accordingly, the self-hold means and the automatic return control means are both disabled and the first and the second switching means assume their normal or standby conditions.

Other objects and features of the invention will become apparent from the following description of preferred embodiments thereof with reference to the drawings.

DESCRIPTION OF PREFERRED EMBODIMENTS

Figure 1:
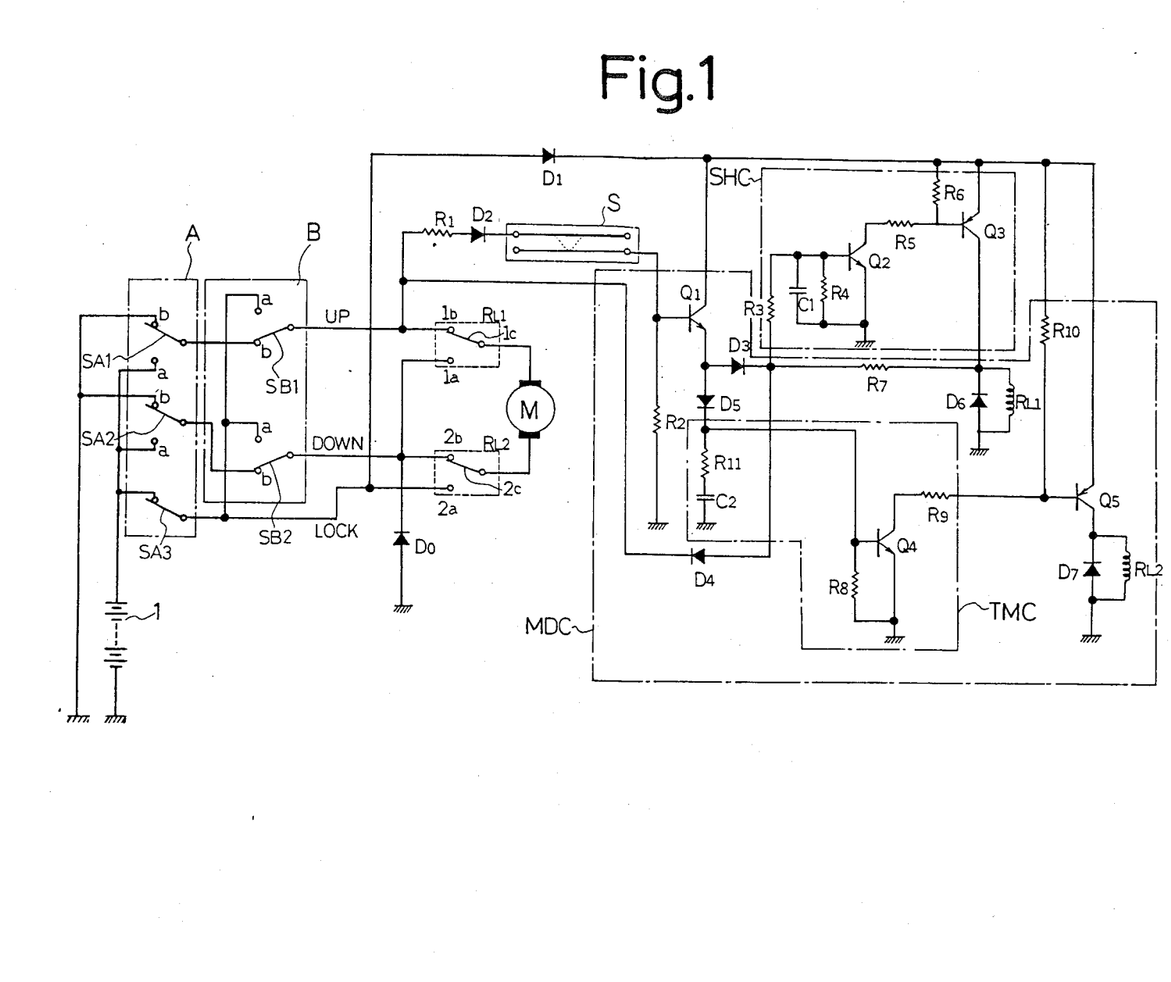
FIG. 1 is a circuit diagram of a first embodiment of the invention.

Referring to FIG. 1 which shows a first embodiment of the invention, there is shown a battery 1 which is mounted on an automobile and which has its opposite terminals connected to a switch unit A mounted on a front panel of an automobile for operation by a driver. The unit A includes an up switch SA1 which, when operated, commands that a side window pane 12 (see FIG. 2) be driven upwardly, a down switch SA2 which commands a downward drive, and a lock switch SA3 which is effective to disable a command to the window pane drive given by a unit B located adjacent to the door. It will be noted that each of the up and the down switch SA1, SA2 is a changeover switch having a normally closed contact b and a normally open contact a. The switch is thrown or closed to the contact a as long as the driver keeps a switch button depressed, but as soon as the switch button is released, the switch automatically transfers from the contact a to the contact b. The contact a is connected to the positive terminal of the battery 1 while the contact b is connected to the negative terminal or ground potential. The lock switch SA3 is interposed between the positive terminal of the battery 1 and a lock signal line "LOCK", thus merely making or breaking the connection therebetween. It is to be noted that if the switch button is depressed when the switch is closed, it changes to its open position which is maintained even after the switch button is released. Conversely, if the switch button is depressed when the switch is open, it changes to its closed position which is maintained even after the switch button is released.

Figure 2:
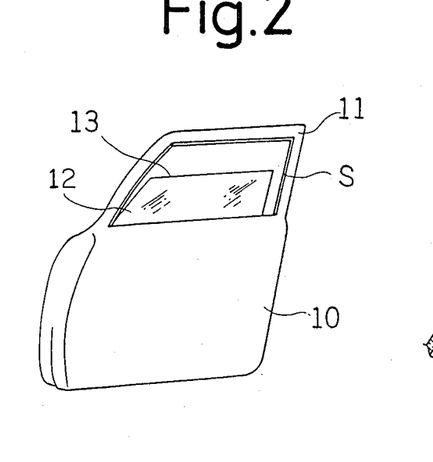
FIG. 2 is a perspective view illustrating the appearance of a door of an automobile which is equipped with a door switch unit, a d.c. motor, a pressure sensitive switch, a self-hold circuit and an automatic return control circuit shown in FIG. 1.

The up and down switches SA1 and SA2 are connected to the normally closed contact b of switches SB1 and SB2, respectively, of a switch unit B which are mounted on a door 10 (see FIG. 2). The switches SB1 and SB2 are changeover switches similar to switches SA1 and SA2. Both switches SB1 and SB2 have a contact a which is connected to the lock switch SA3. The described switch units A and B constitute a load drive command switch assembly.

A first supply line UP connected to the up switch SB1 is connected to the normally closed contact 1b of a first relay RL1, and a second supply line DOWN connected to the down switch SB2 is connected to the normally closed contact 2b of a second relay RL2. The first relay RL1 has a normally open contact 1a which is connected to the second line DOWN, and the second relay RL2 has a normally open contact 2a which is connected to a positive potential line LOCK. It is to be noted that the lock switch SA3 is normally closed, whereby a positive potential is applied to the line LOCK which is connected to the switch SA3. Where the lock switch SA3 is not provided, the normally open contact 2a of the second relay RL2 and the anode of a diode D1 may be connected to the first supply line UP.

Under normal condition when both the first and the second relay RL1, RL2 are not energized and relay contacts 1c and 2c are thrown to contacts 1b and 2b, respectively, as shown in FIG. 1, the closure of either up switch SA1 or SB1 with the contact a applies a positive voltage to the first supply line UP, whereby a d.c. motor M is energized for forward rotation which is transmitted through a gearing and linkage (not shown) to drive a window pane 12 (FIG. 2) upward. The closure of either down switch SA2 or SB2 applies a positive voltage to the second supply line DOWN, whereby the d.c. motor M is energized for reverse rotation to drive the window pane 12 downward. When the lock switch SA3 is open, the connection between the contacts a of the switches SB1 and SB2 and the battery 1 is interrupted, and hence the closure of either switch SB1 or SB2 with the contact a cannot energize the motor M.

Figure 3:
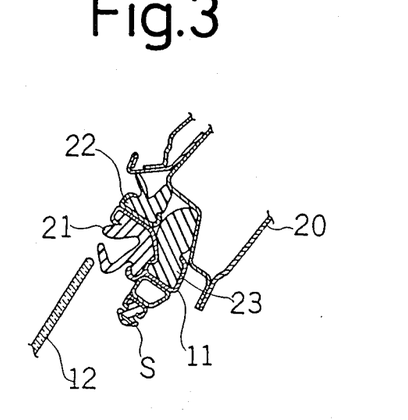
FIG. 3 is an enlarged transverse section of a window frame shown in FIG. 2.

A pressure sensitive switch S is connected to the first supply line UP through a resistor R1 and a diode D2. As shown in FIG. 2, the switch S extends along the top and the both lateral sides of a side window frame 11, and is disposed within a vehicle on the inside of the window pane 12, as indicated in FIG. 3. In FIG. 3, an elastic member 21 is disposed for abutment by the window pane 12, and elastic members 22 and 23 are secured to the door 11 for abutment against a car body 20 as the door is closed. The pressure sensitive switch S comprises a pair of wires with an air space or an elastic conductive layer interposed therebetween, and is arranged such that the resistance across the pair of wires reduces substantially when it is compressed with a pressure above a given value. One of the wires of the switch S is connected to the diode D2 while the other wire is connected to one end of a resistor R2 and to the base of a transistor Q1, both contained in an automatic return control circuit MDC. The other end of the resistor R2 is connected to the ground potential. When the positive potential is applied to the first supply line UP (in response to an up command), the absence of an obstacle which compresses the switch S results in an increased resistance across the pair of conductors of the switch S, and accordingly, the voltage across the resistor R2 is low to maintain the transistor Q1 off. However, when the switch S is compressed by an object such as a hand, for example, to reduce the resistance across the pair of conductors of the switch S below a given value, the base potential of the transistor Q1 rises to render it conductive. The conduction of the transistor Q1 applies a positive voltage (latch command) to a self-hold circuit SHC through a diode D3, and also energizes the relay RL1, whereby the relay contact 1c is moved into contact with the normally open contact 1a. At the same time, the positive voltage is applied through a diode D5 to a timer circuit TMC. In the timer circuit TMC, a transistor Q4 is rendered conductive at a given time interval after the application of the positive voltage thereto, which is determined by the values of a resistor R11 and a capacitor C2. The conduction of the transistor Q4 causes a transistor Q5 in the automatic return control circuit MDC to conduct, whereby the relay RL2 is energized to bring its relay contact 2c into contact with the normally open contact 2a.

If the switch S detects the presence of an object when the positive voltage is applied to the first supply line UP (namely, when either up switch SA1 or SB1 is engaged with the contact a, representing an up command), it should be noted that the relay contacts 1c and 2c are moved into contact with the contacts 1a and 2a, respectively. In response to the application of the positive voltage through the diode D3 to the self-hold circuit SHC, a transistor Q2 is rendered conductive, whereby a transistor Q3 conducts. The transistor Q3 feeds a positive voltage or self-hold input to a resistor R3 through a resistor R7, and also energizes the relay RL1. The circuit SHC includes a capacitor C1 of a small capacitance, which serves as suppressing noises or surge voltages. Hence, a time lag from the time when the cathode of the diode D3 assumes a positive potential until the transistor Q2 is rendered conductive is very short. When the switch S ceases to detect the presence of an object, or when the resistance across the pair of conductors of the switch S reverts to a high value, the transistor Q1 is returned to its off condition, whereby a current flow through the diode D3 to the relay RL1 ceases. However, the conduction of the transistor Q3 is effective to maintain the positive voltage which is applied to the self-hold circuit SHC, through resistors R7 and R3, thus allowing the transistor Q2 and hence the transistor Q3 to remain on to continue the energization of the relay RL1. In the timer circuit TMC, the capacitor C2 discharges through a resistor R11 and another resistor R8 since the transistor Q1 is turned off, causing the voltage across the resistor R8 to reduce in a gradual manner. When such voltage reduces below a given value, the transistor Q4 is turned off, whereby the transistor Q5 is turned off to deenergize the relay RL2, thus returning the relay contact 2c into contact with the contact 2b. As a result, the both terminals of the motor M are connected to the second supply line DOWN.

It is to be noted that a time interval Ton which is required for the transistor Q4 to be turned on since the presence of an object is detected by the switch S is determined by the values of the resistor R11 and the capacitor C2 and that a time interval Toff required for the transistor Q4 to be turned off since the switch S ceases to detect the presence of an object is determined by the values of the resistor R11, capacitor C2 and resistor R8, with a relationship such that Ton<Toff.

The operation of the circuit shown in FIG. 1 in response to a switch operation within the switch units A and B will now be described.

(1) When lock switch SA3 is closed (no lock command)

(A) Upward drive: When either up switch SA1 or SB1 is closed to the contact a, the positive potential is applied to the first supply line UP and hence to the relay contact 1c. Since the relay contact 2c is connected to the ground potential through the down switches SB2 and SA2, the motor M is energized for forward rotation, driving the window pane 12 upward. If there is an object, for example, a hand, between the upper end of the pane 12 and the frame 11, and such object is driven by the pane 12 against the switch S, the resistance which the switch S exhibits is reduced, rendering the transistor Q1 conductive. This energizes the first relay RL1, whereby the relay contact 1c is moved into contact with the contact 1a, thus ceasing the energization of the motor M. At the same time, transistors Q2 and Q3 in the self-hold circuit SHC are rendered conductive, and the circuit SHC is self-holding to continue the energization of the first relay RL1. At an interval of Ton after the conduction of the transistor Q1, the transistors Q4 and Q5 are rendered conductive to energize the second relay RL2, whereby the relay contact 2c is transferred to the contact 2a. Since the relay contact 1c is at the ground potential while the relay contact 2c is at the positive potential, this causes the motor M to be driven in the reverse direction, thus moving the window pane 12 downward. As the pane 12 moves down and the switch S ceases to detect the presence of an object, the transistor Q1 returns to its off condition. At an interval of Toff after the turning off of the transistor Q1, the both transistors Q4 and Q5 are turned off to deenergize the second relay RL2, whereby the contact 2c assumes the ground potential, by connection to the second supply line DOWN to stop the motion of the motor M (return motion stopped). If either down switch SA2 or SB2 is thrown to the contact a (down command) when the motor is at rest, the contact 2c is at the positive potential while the contact 1c is at the ground potential, and hence the motor M returns in the reverse direction to move the pane 12 down.

With the return motion stopped, if either up switch SA1 or SA2 which have been thrown to the contact a is returned to the contact b (termination of up command), the first supply line UP assumes the ground potential, which is applied through the diode D4 to the resistor R3 in the self-hold circuit SHC, thus turning the transistors Q2 and Q3 off (reset of self-hold circuit). This deenergizes the first relay RL1, whereby the contact 1c transfers to the contact 1b. Since both relay contacts 1c and 2c assume the ground potential, the motor M remains stationary, which is the condition illustrated in FIG. 1 or which prevails before the up switch is operated.

In this embodiment, if an object is interposed between the pane 12 and the frame 11 during the time the pane 12 is being driven upward by depressing the button of either up switch SA1 or SB1, the rotation of the motor M in the forward direction is interrupted and the upward movement of the pane 12 is halted for a time interval of Ton, and then the motor M is energized for reverse rotation during a given time interval of Toff to move the pane 12 downward, and after such time interval, the motor M comes to a stop. When the button of the up switch is released, the self-hold circuit SHC is reset. Thus the up switch acts as a reset switch.

(B) Downward drive: When either down switch SA2 or SB2 is closed to the contact a, the positive potential is applied to the second supply line DOWN, and hence to the relay contact 2c. Since the relay contact 1c is connected to the ground potential through the up switches SB1 and SA1, the motor M is energized for reverse rotation to move the pane 12 downward. During the downward drive, the first supply line UP assumes the ground potential, and hence the switch S normally assumes the ground potential, preventing the self-hold circuit SHC and the automatic return control circuit MDC from operating.

(2) When the lock switch SA3 is open (lock command)

(A) Upward drive: When the up switch SA1 is closed to the contact a, the first supply line UP assumes the positive potential as does the relay contact 1c. The relay contact 2c is connected to the ground potential through the down switches SB2 and SA2, so that the motor M rotates in the forward direction, moving the pane 12 upward. Since the switch SA3 is open, the self-hold circuit SHC and the automatic return control circuit TMC do not operate. The motor M cannot be energized if the up switch SB1 is closed to the contact a, since this contact is disconnected from the positive terminal of the battery 1 by the switch SA3.

(B) Downward Drive: When the down switch SA2 is closed to the contact a, the second supply line DOWN assumes the positive potential as does the relay contact 2c. The relay contact 1c is connected to the ground potential through the up switches SB1 and SA1, so the motor M rotates in the reverse direction to move the pane 12 downward. During the downward drive, the first supply line UP assumes the ground potential and the switch SA3 is open, so that the self-hold circuit SHC and the automatic return control circuit TMC do not operate. The motor M cannot be energized if the down switch SB2 is closed to the contact a, since this contact is disconnected from the positive terminal of the battery 1 by the switch SA3.

It is to be noted that in the embodiment described above in connection with FIG. 1, the switch S, the self-hold circuit SHC and the automatic return control circuit TMC are operative only when the pane 12 is being driven upward. It is also to be noted that the self-hold circuit SHC is reset as either up switch SA1 or SB1 is returned to the contact b in response to the termination of the up command.

Figure 4:
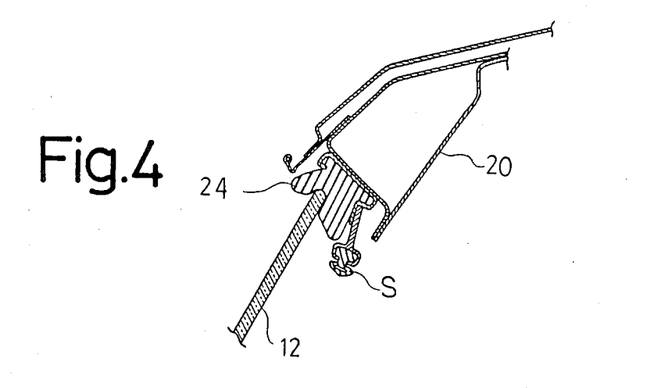
FIG. 4 is an enlarged transverse section of an upper edge of a door opening of an automobile of hard-top type.

As shown in FIGS. 2 and 3, the pressure sensitive switch S is mounted on the window frame 11 of the door. For an automobile having a hard top, the switch S may be mounted along the edge of a door opening of a car body 20, as illustrated in FIG. 4. In FIG. 4, an elastic member 24 is applied to the edge of the door opening.

Figure 5:
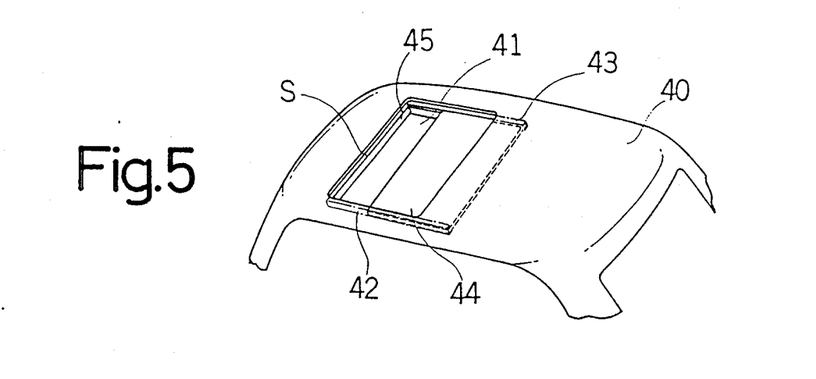
FIG. 5 is a perspective view illustrating the appearance of a roof of an automobile.

The first embodiment described above may be used in a system which drives a roof panel 44 of an automobile as illustrated in FIG. 5. The pressure sensitive switch S is mounted along the edge of an opening 41 formed in a roof 40. A pair of guide rails 42, 43 are provided to guide the movement of the panel 44, which is driven to the left as the motor M rotates forwardly and which is driven to the right as the motor rotates reversely. A seal member 45 is provided.

Figure 6:
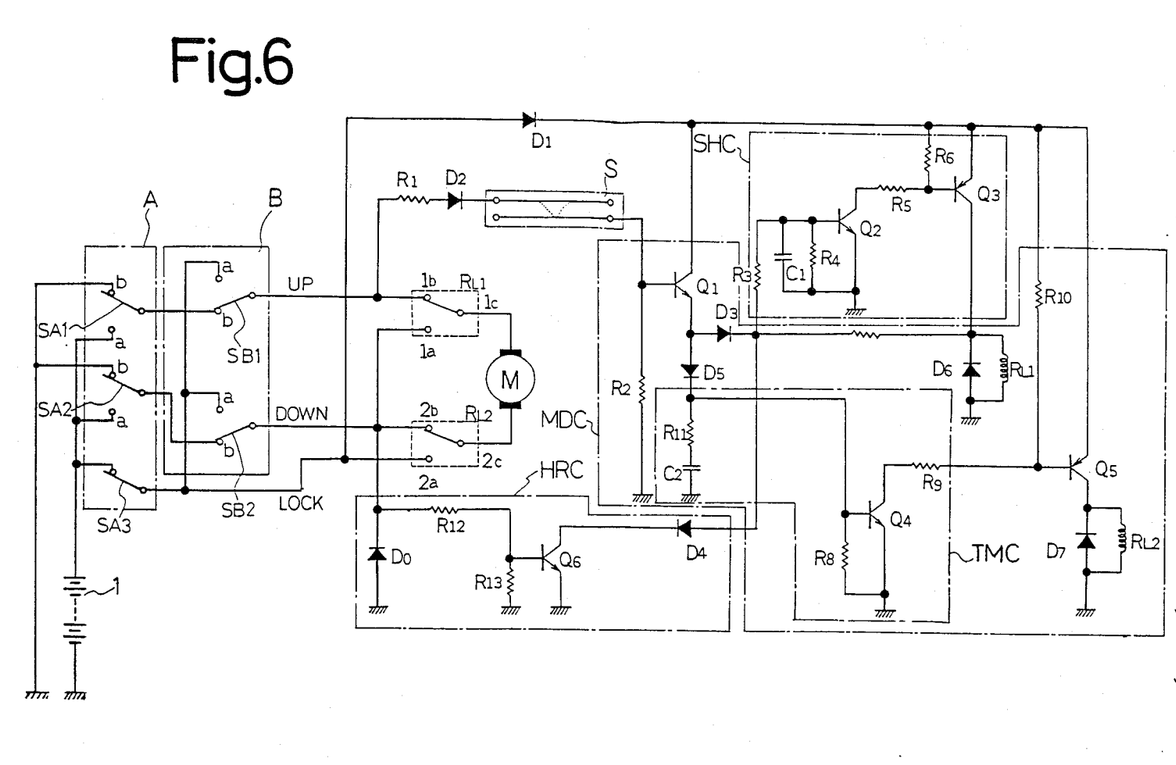
FIG. 6 is a circuit diagram of a second embodiment of the invention.

Referring to FIG. 6, there is shown a second embodiment of the invention in which a reset circuit HRC is connected to the input of the self-hold circuit SHC so that the self-hold circuit SHC is reset by a conduction of a transistor Q6 when the second supply line DOWN assumes a positive potential (down command). In other respects, the circuit arrangement is similar to that of the first embodiment shown in FIG. 1. In the second embodiment, if the switch S is closed or exhibits a reduced resistance to activate the self-hold circuit SHC under the condition that either up switch SA1 or SB1 is closed to the contact a (up command), returning the up switch to the contact b (cessation of up command) cannot reset the self-hold circuit SHC. When either down switch SA2 or SB2 is closed to the contact a (down command), the self-hold circuit SHC is reset to deenergize the relay RL1, whereby the contact 1c is transferred to the contact 1b. If either up switch SA1 or SB1 is closed to the contact a (up command), the motor M cannot be energized since the both contacts 1c and 2c are at the ground potential. However, if both the up switches SA1 and SB1 are closed to the contact b (without up command), the contact 1c assumes the ground potential while the contact 2c assumes the positive potential, so that the motor M rotates in the reverse direction to move the pane 12 downward in the same manner as occurs normally in respect to the up command (switch SA2 or SB2 being closed to the contact a). In the second embodiment, the both down switches SA2 and SB2 represent reset switches.

Figure 7:
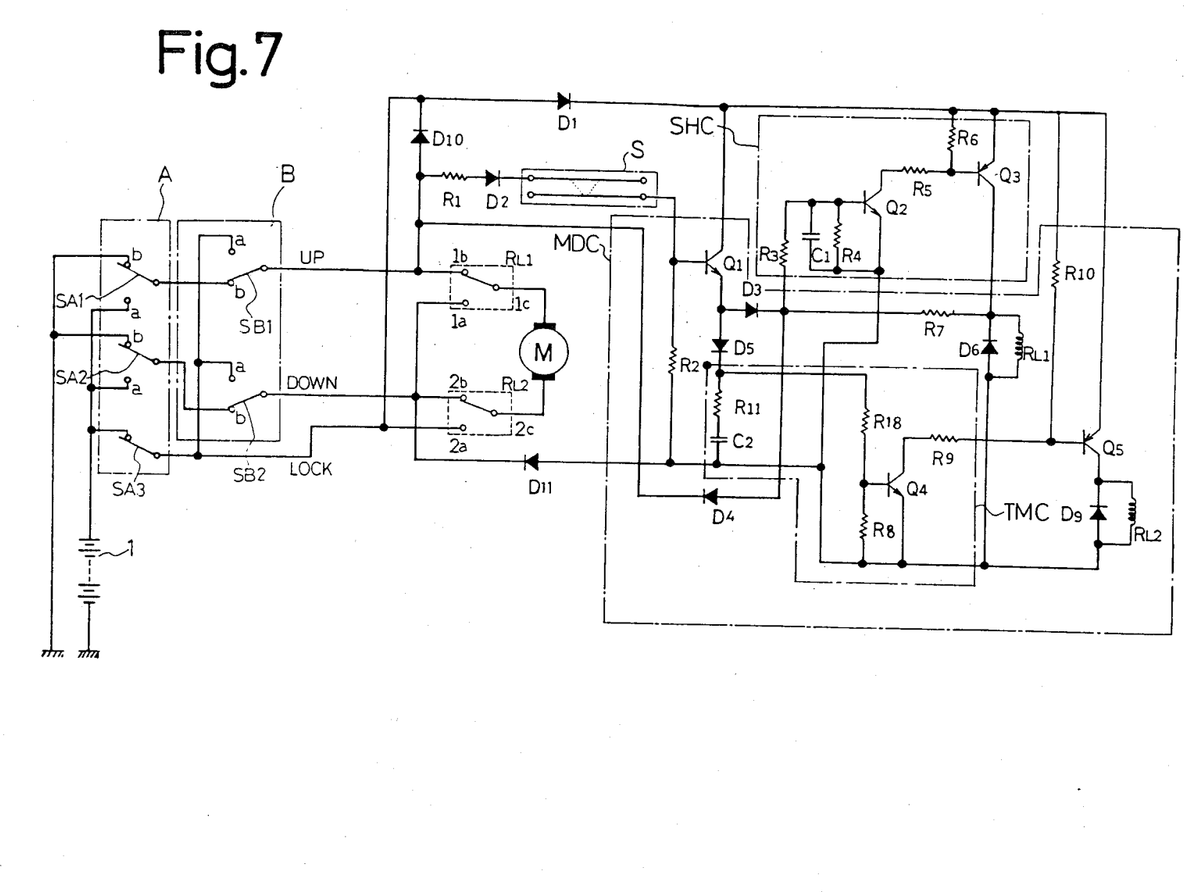
FIG. 7 is a circuit diagram of a third embodiment of the invention.

Referring to FIG. 7 which shows a third embodiment of the invention, points within the self-hold circuit SHC and the automatic return control circuit MDC which assume the ground potential are connected together by a single conductor and connected through a diode D11 to the second supply line DOWN. The positive potential on the line LOCK and the potential on the first supply line UP are applied to these circuits SHC and MDC. In other respects, the circuit arrangement is similar to that of the first embodiment shown in FIG. 1.

In the third embodiment, when either up switch SA1 or SB1 is closed to the contact a, the first supply line UP assumes the positive potential as does the relay contact 1c. The relay contact 2c is connected to the ground potential through the down switches SB2 and SA2, and hence the motor M rotates forwardly to move the pane upward. If an object such as hand, for example, is interposed between the upper edge 13 of the pane 12 and the frame 11 and is urged by the pane 12 against the switch S, the transistor Q1 is rendered conductive. This energizes the first relay RL1 to bring the relay contact 1c into contact with the contact 1a, thus ceasing the energization of the motor M and causing the transistors Q2 and Q3 in the self-hold circuit SHC to conduct, which is then self-holding to continue the energization of the first relay RL1. At a time interval of Ton after the conduction of the transistor Q1, the transistors Q4 and Q5 are rendered conductive to energize the second relay RL2, whereby the relay contact 2c is transferred to the contact 2a. This causes the motor M to rotate reversely to move the pane 12 downward since the relay contact 1c assumes the ground potential while the relay contact 2c assumes the positive potential. As the pane 12 moves down and the switch S ceases to detect the presence of an object, the transistor Q1 is turned back to its off condition. At a time interval of Toff after the transistor Q1 is turned off, the both transistors Q4 and Q5 are turned off to deenergize the second relay RL2, whereby the contact 2c assumes the ground potential by connection to the second supply line DOWN to stop the rotation of the motor M (return motion stopped). If the up switch is returned to the contact b under this stop condition, the self-hold circuit SHC is reset and thus returns to its normal condition.

The described operation is similar to the operation of the first embodiment. However, in the third embodiment, the self-hold circuit SHC can also be reset by moving either down switch SA2 or SB2 to the contact a under the return motion stopped condition. Specifically, with the return motion stopped, bringing either down switch SA2 or SB2 into contact with the contact a causes the contact 2c to assume the positive potential, whereby the diode D11 is reversely biased, presenting an equal potential at the input and the output of the self-hold circuit SHC. This causes the transistors Q2 and Q3 to be turned off to deenergize the relay RL1, whereby the contact 1c is returned into contact with the contact 1b. Accordingly, in the third embodiment, both the up and down switches represent reset switches. When either down switch SA2 or SB2 is thrown to the contact a (down command), the sensor S assumes the ground potential and hence does not develop an object detection signal. Since points within the self-hold circuit SHC and the automatic return control circuit MDC which assume the ground potential are connected together by a single conductor and connected through the diode D11 to the second supply line DOWN, the conductor assumes the positive potential, which prevents the self-hold circuit SHC and the automatic return control circuit MDC from operating.

Figure 8:
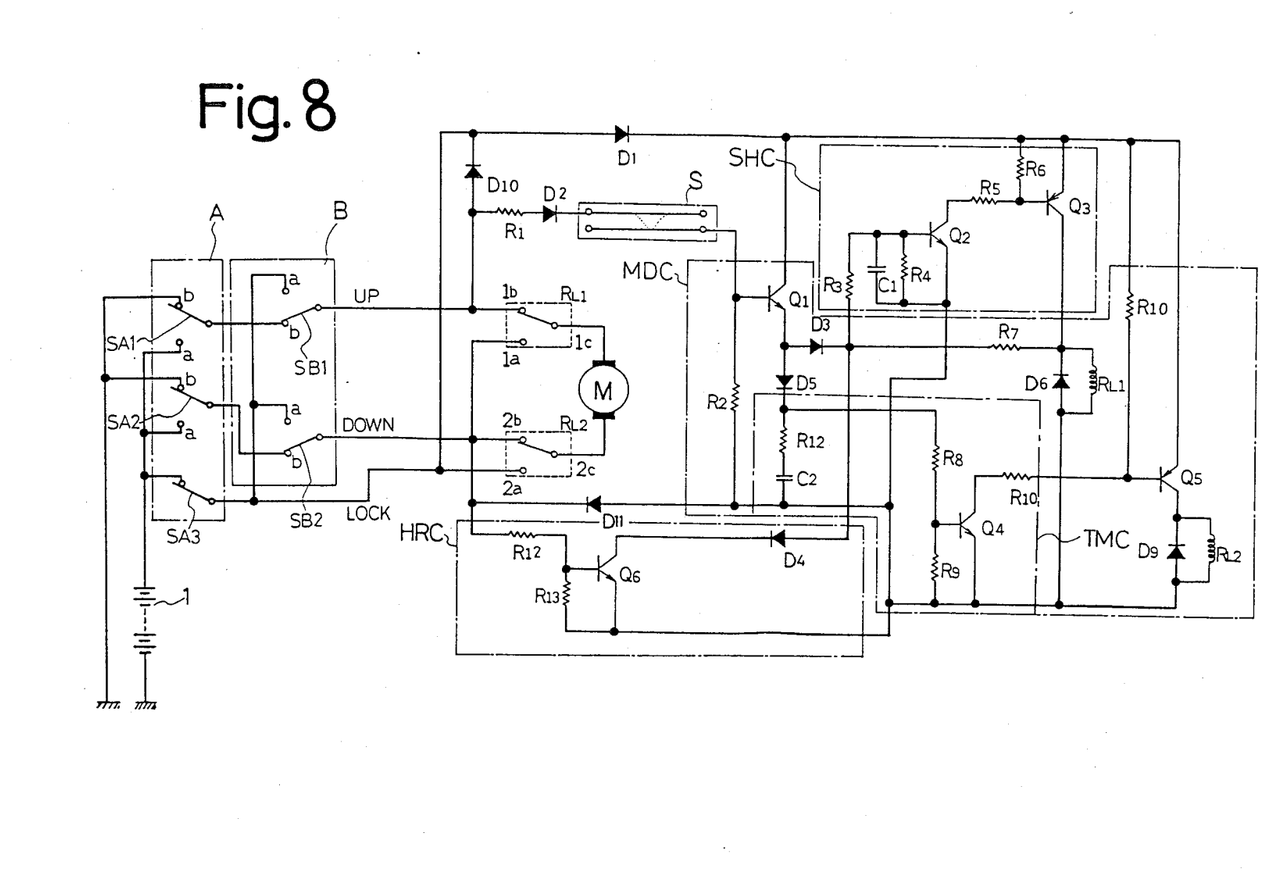
FIG. 8 is a circuit diagram of a fourth embodiment of the invention.

FIG. 8 shows a fourth embodiment of the invention in which when either down switch SA2 or SB2 is thrown to the contact a (down command), the transistor Q6 in the reset circuit HRC is rendered conductive to bring the base potential of the transistor Q2 in the self-hold circuit SHC to a level which is equal to the emitter potential thereof, thus bypassing an object detection signal from the self-hold circuit SHC. In other respects, the circuit arrangement is similar to that of the third embodiment.

Figure 9:
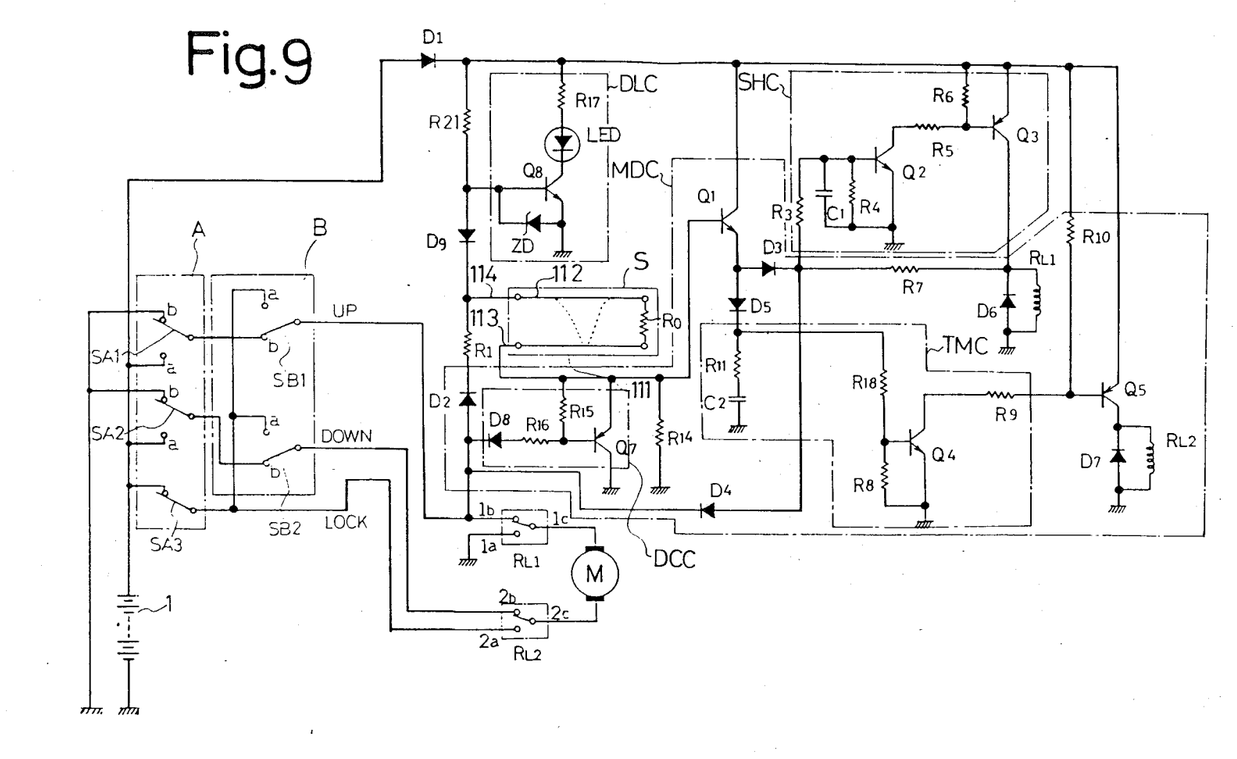
FIG. 9 is a circuit diagram of a fifth embodiment of the invention.

FIG. 9 shows a fifth embodiment of the invention in which an indicator circuit DLC are connected across the supply lines and includes a transistor Q8, to the base of which is connected the pressure sensitive switch S which is also connected to an indicator control circuit DCC. A combination of a transistor Q7 and a resistor R14 is connected to the output of the switch S. In other respects, the circuit arrangement is similar to that of the first embodiment shown in FIG. 1.

Figure 10A:
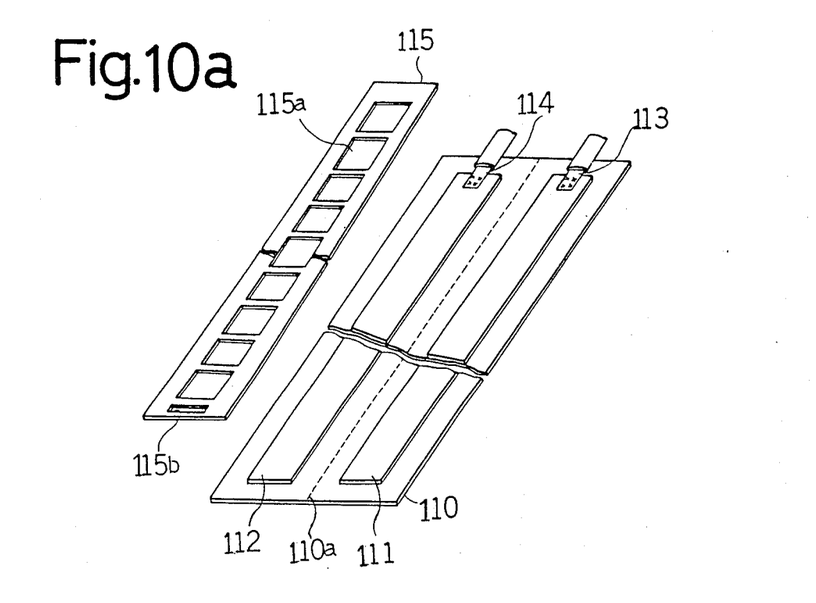
FIG. 10a is an enlarged, exploded perspective view of a pressure sensitive sensor shown in FIG. 9.
Figure 10B:
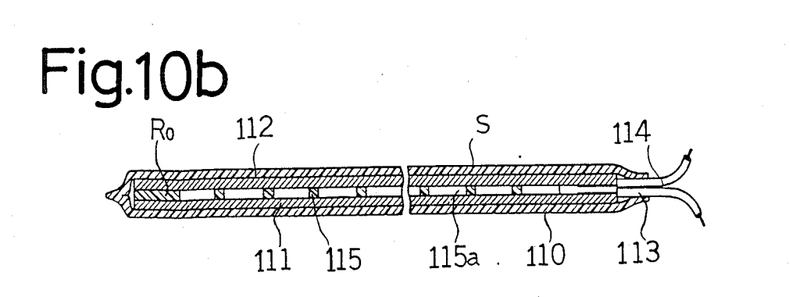
FIG. 10b is an enlarged longitudinal section of a pressure sensitive sensor shown in FIG. 9.
Figure 10C:
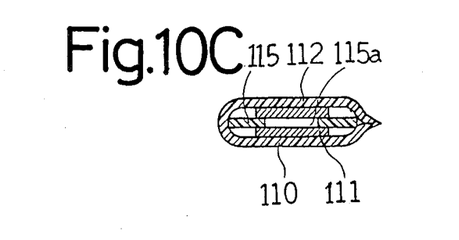
FIG. 10c is an enlarged transverse section of a pressure sensitive sensor shown in FIG. 9.

In the fifth embodiment, the pressure sensitive switch S includes a resistor R0 connected across a pair of conductors 111, 112 in order to produce a resistance of a relatively low magnitude across the input and output terminals thereof when no object is being detected. FIG. 10a is an explosed perspective view, FIG. 10b is a longitudinal section and FIG. 10c is a transverse section of the switch S. As shown, the conductors 111 and 112 are applied to an insulating sheet 110, and a thin insulating sheet 115 having openings 115a and 115b formed therein is interposed between the conductors 111 and 112. A resistor chip R0 is fitted into the opening 115b to provide a connection between the conductors 111 and 112.

When neither switch unit A nor B is operated, and the switches SA1, SB1, SA2 and SB2 are thrown to their contacts b and the lock switch SA3 is closed as shown in FIG. 9, the battery voltage is applied to a series path including a resistor R21, sensor S and resistors R15 and R16, whereby in the indicator control circuit DCC, a potential at the junction between the resistors R15 and R16 is applied to the base of a transistor Q7 to render it conductive. This establishes a low base potential of a transistor Q8 contained in the indicator circuit DLC, and hence the transistor Q8 is non-conductive, preventing a light emitting diode LED from being energized. If a circuit interruption occurs as by breakage in a path between an input line 114 to the sensor S and the transistor Q7, a high voltage of the resistor R1 causes the transistor Q8 to conduct, thus energizing the light emitting diode LED.

In the fifth embodiment, the window pane 12 is driven upward and downward in response to an operation of the up switches SA1, SB1 and the down switches SA2, SB2, generally in the same manner as in the first embodiment of FIG. 1. When the up switch is closed to the contact a, the first supply line UP assumes the positive potential, whereby the diode D8 in the indicator control circuit DCC is reversely biased to present an equal potential at the emitter and the base of the transistor Q7, which therefore becomes non-conductive. This allows the base potential of the transistor Q8 in the indicator circuit DLC to be raised, allowing the transistor Q8 to conduct to energize the light emitting diode LED.

When the down switch is closed to the contact a, the light emitting diode LED cannot be energized since the first supply line UP assumes the ground potential. Thus in the fifth embodiment, the light emitting diode LED is deenergized when the up and down switches are not operated, but is energized when a breakage occurs in the sensor S. The light emitting diode LED is also energized during the time when the up switch is closed to the contact a in response to an up command. In this manner, the occurrence of a breakage and an upward drive command for the window pane are annunciated. The light emitting diode LED is mounted on the front panel, located in front of the driver's seat, as is the switch unit A, and thus an operation of the up switch SB1 in the unit B is annunciated to the driver by means of the light emitting diode LED.

Figure 11:
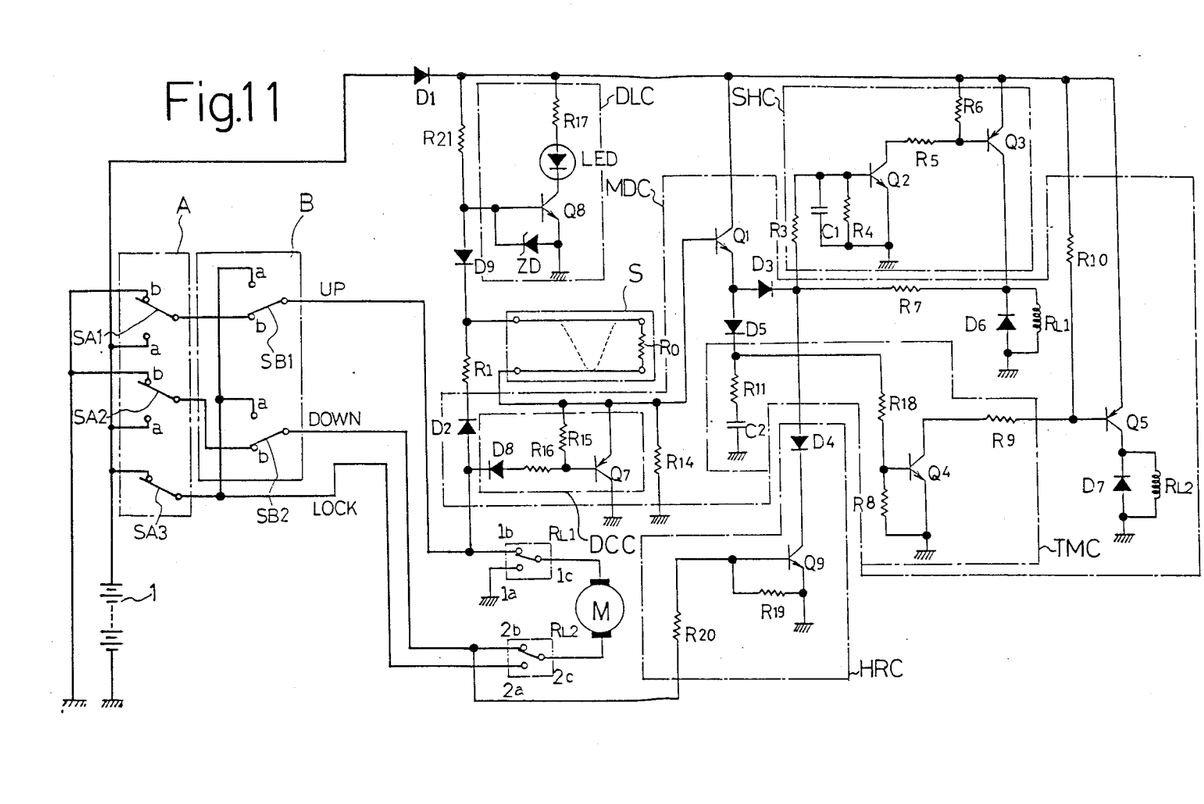
FIG. 11 is a circuit diagram of a sixth embodiment of the invention.

FIG. 11 shows a sixth embodiment of the invention which includes an indicator circuit DLC and an indicator control circuit DCC in the same manner as in the fifth embodiment. In this embodiment, a reset circuit HRC is connected to the input of the self-hold circuit SHC in order to reset the self-hold circuit SHC in response to an operation of either down switch SA2 or SB2. An indicator operation of the sixth embodiment is similar to that of the fifth embodiment shown in FIG. 9, and a reset operation occurs in the similar manner as in the second embodiment shown in FIG. 6.

Having described preferred embodiments of the invention, modifications will be evident to those skilled in the art without departing from the spirit and scope of the invention as defined by the appended claims.

What is claimed is:

1. A load drive control system comprising
   a d.c. motor for driving a load in a forward and a reverse direction, the motor having a first and a second terminal which feed the motor;
   a plurality of supply lines which supply a voltage to the motor to energize it;
   first switching means for selectively applying a first or a second potential on the supply lines to the first terminal;
   second switching means for selectively applying the second or the first potential on the supply lines to the second terminal;
   a sensor for detecting the presence of any object which stands in the way to the movement of a load;
   self-hold means for changing the first switching means to a condition in which it applies the second potential to the first terminal in response to a detection signal from the sensor;
   automatic return control means for changing the second switching means to a condition in which it applies the first potential to the second terminal in response to a detection signal from the sensor and subsequently for changing the second switching means to a condition in which it applies the second potential to the second terminal in response to the cessation of a detection signal from the sensor;
   and reset means for resetting the self-hold means.

2. A load drive control system according to claim 1, further comprising up command switch means and down command switch means for selectively applying a high or a low potential from a power supply to the supply lines.

3. A load drive control system according to claim 1 in which the automatic return control means includes timer means which changes the second switching means to a condition in which it applies the first potential to the second terminal at a first time interval after the sensor has produced a detection signal and for changing the second switching means to a condition in which it applies the second potential to the second terminal at a second time interval after the sensor has ceased to produce the detection signal.

4. A load drive control system according to claim 1 in which the load represents a glass pane or panel which covers an opening of an automobile and in which the sensor comprises a pressure sensitive switch having a substantial length which extends along the edge of the opening.

5. A load drive control system according to claim 1 in which each of the first and the second switching means comprises a relay contact and in which the automatic return control means includes relay coils, each of which is energized to switch the relay contact.

6. A load drive control system according to claim 2 in which each of the up command switch means and the down command switch means comprises a changeover switch.

7. A load drive control system according to claim 6 in which the reset means comprises the up command switch means.

8. A load drive control system according to claim 6 in which the reset means comprises the down command switch means.

9. A load drive control system according to claim 6, further comprising indicator means, and indicator control means connected to the up command switch means and the sensor for energizing the indicator means in response to a breakage which occurs in the sensor when no drive is commanded by the up command switch means.

10. A load drive control system comprising
    a d.c. motor for driving a load in a forward and a reverse direction, the motor having a first and a second terminal which feed the motor;

a plurality of supply lines which supply a voltage to energize the motor;

a first changeover switch connected to one of the supply lines for selectively applying a first or a second potential to said one supply line;

a second changeover switch connected to another one of the supply lines for selectively applying a first or a second potential to said another supply line;

a first relay contact for selectively connecting one of the supply lines to the first terminal;

a second relay contact for selectively connecting another one of the supply lines to the second terminal;

a sensor having its input connected to one of the supply lines for detecting the presence of any object which stands in the way to the movement of the load;

automatic return control means including a first and a second relay coil which drive the first and the second relay contact, respectively, the control means being responsive to an output signal from the sensor to energize the second relay coil in response to the conduction of the sensor and subsequently to deenergize the second relay coil at a given time interval after the sensor is rendered non-conductive;

a self-hold circuit responsive to an output signal from the sensor for causing the automatic return control means to energize the first relay coil in response to the conduction of the sensor and for maintaining such condition;

and reset means for resetting the self-hold circuit.

11. A load drive control system according to Claim 10 in which the reset means comprises a conductor which couples the first changeover switch and the input of the self-hold circuit.

12. A load drive control system according to Claim 10 in which the reset means comprises a reset circuit connected to the second changeover switch for applying a reset signal to the self-hold circuit in response to the first potential.

13. A load drive control system comprising a d.c. motor for driving a load in a forward and a reverse direction, the motor having a first and a second terminal which feed the motor;

a plurality of supply lines which provide a voltage to energize the motor;

a first changeover switch connected to one of the supply lines for selectively applying a first or a second potential to said one supply line;

a second changeover switch connected to another one of the supply lines for selectively applying a first or a second potential to said another supply line;

a first relay contact for selectively connecting one of the supply lines to the first terminal;

a second relay contact for selectively connecting another one of the supply lines to the second terminal;

a sensor having its input connected to one of the supply lines and including a resistor of a given value connected across its input and output, a path between the input and the output of the sensor being rendered conductive when the sensor is subject to a pressure by an object;

automatic return control means including a first and a second relay coil which drive the first and the second relay contact, respectively, the control means being connected to an output terminal of the sensor to energize the second relay coil in response to the conduction of the sensor and subsequently to deenergize the second relay coil at a given time interval after the sensor is rendered non-conductive;

a self-hold circuit responsive to an output signal from the sensor for causing the automatic return control means to energize the first relay coil in response to the conduction of the sensor and for maintaining such condition;

reset means for resetting the self-hold curcuit;

an indicator circuit connected to one of the supply lines which carries the first potential;

and an indicator control circuit operative to detect the occurrence of a breakage in the sensor and to activate the indicator circuit upon such occurrence.

14. A load drive control system according to claim 13 in which the reset means comprises conductor means which couples the first changeover switch with the input of the self-hold circuit.

15. A load drive control system according to claim 13 in which the reset means comprises a reset circuit connected to the second changeover switch and operative to apply a reset signal to the self-hold circuit in response to the first potential.

16. A load drive control system according to claim 13 in which the indicator control circuit comprises switching means which is connected to the first changeover switch and the sensor and which is operative to energize the indicator circuit when the first changeover switch assumes the first potential and to energize the indicator circuit in response to the occurrence of a breakage in the sensor when the first changeover switch assumes the second potential.

* * * * *